United States Patent
Hoffmann et al.

(10) Patent No.: US 8,931,091 B2
(45) Date of Patent: Jan. 6, 2015

(54) METHOD FOR OPERATING A TACHOGRAPH AND TACHOGRAPH

(75) Inventors: Klaus Hoffmann, Villingen-Schwenningen (DE); Andreas Lindinger, Flözlingen (DE)

(73) Assignee: Continental Automotive GmbH, Hannover (DE)

( * ) Notice: Subject to any disclaimer, the term of this patent is extended or adjusted under 35 U.S.C. 154(b) by 334 days.

(21) Appl. No.: 13/504,848

(22) PCT Filed: Oct. 18, 2010

(86) PCT No.: PCT/EP2010/065605
§ 371 (c)(1),
(2), (4) Date: Jul. 11, 2012

(87) PCT Pub. No.: WO2011/051128
PCT Pub. Date: May 5, 2011

(65) Prior Publication Data
US 2012/0269341 A1 Oct. 25, 2012

(30) Foreign Application Priority Data
Oct. 30, 2009 (DE) .......................... 10 2009 051 350

(51) Int. Cl.
*G06F 12/14* (2006.01)
*G07C 5/08* (2006.01)
*G05B 19/042* (2006.01)
*G06F 21/57* (2013.01)
*H04L 9/32* (2006.01)

(52) U.S. Cl.
CPC ............ *G07C 5/085* (2013.01); *G05B 19/0428* (2013.01); *G06F 21/572* (2013.01); *H04L 9/3247* (2013.01); *G05B 2219/23464* (2013.01); *G06F 2221/2107* (2013.01); *G06F 2221/2129* (2013.01); *H04L 2209/84* (2013.01)
USPC .......................................................... 726/22

(58) Field of Classification Search
None
See application file for complete search history.

(56) References Cited

U.S. PATENT DOCUMENTS

| 5,956,408 A | 9/1999 | Arnold |
| 2002/0120856 A1 | 8/2002 | Schmidt et al. |
| 2007/0028120 A1 | 2/2007 | Wysocki et al. |
| 2007/0050622 A1* | 3/2007 | Rager et al. ................... 713/168 |

(Continued)

FOREIGN PATENT DOCUMENTS

| DE | 100 08 974 A1 | 9/2001 |
| DE | 10 2007 004 645 A1 | 7/2008 |
| DE | 10 2007 058 163 A1 | 4/2009 |
| WO | WO 2006/053998 A1 | 5/2006 |

*Primary Examiner* — Brandon Hoffman
(74) *Attorney, Agent, or Firm* — Cozen O'Connor

(57) ABSTRACT

A method for operating a tachograph having an application controller and a safety controller. A memory is associated with the application controller and a further memory is associated with the safety controller. An encrypted program code having at least one associated signature is made available to the safety controller. The encrypted program code is decrypted by means of the security controller and verified by the at least one signature. It is detected whether the decrypted program code (EPC) is intended for the application controller and/or for the security controller. Depending on what is detected, the program in the memory and/or the further program in the further memory is at least partially replaced by the decrypted program code and, depending on a result of the verification, the at least partially replaced program and/or the at least partially replaced further program is released for executing.

10 Claims, 2 Drawing Sheets

(56) References Cited

U.S. PATENT DOCUMENTS

| | | | |
|---|---|---|---|
| 2008/0201398 A1* | 8/2008 | Meyer ........................ 708/491 |
| 2009/0327760 A1 | 12/2009 | Lindinger et al. |
| 2010/0250053 A1 | 9/2010 | Grill et al. |

* cited by examiner

METHOD FOR OPERATING A TACHOGRAPH AND TACHOGRAPH

CROSS REFERENCE TO RELATED APPLICATIONS

This is a U.S. national stage of application No. PCT/EP2010/065605, filed on 18 Oct. 2010. Priority is claimed on German Application No. 10 2009 051 350.7, filed 30 Oct. 2009 the content of which is incorporated here by reference.

BACKGROUND OF THE INVENTION

1. Field of the Invention

The invention relates to a method for operating a tachograph and to a tachograph having an application controller and a security controller.

2. Description of Prior Art

Tachographs may be supervisory appliances installed in a motor vehicle, particularly in a goods or passenger transportation vehicle to allow the activities of a driver and/or co-driver of the vehicle to be monitored.

By way of example, WO 2006/053998 AI describes a tachograph having a security controller and a separate application controller for monitoring the activities of a driver and a co-driver.

SUMMARY OF THE INVENTION

It is an object of the invention to provide a method for operating a tachograph and a tachograph that meets the high demands on security against manipulation and are as reliable as possible.

The invention is distinguished by a method for operating a tachograph and a corresponding tachograph having an application controller and a security controller. The application controller has an associated memory that stores a program that can be executed by the application controller. The security controller has an associated further memory that stores a further program that can be executed by the security controller. The application controller is connected to the security controller. In this arrangement, an encrypted program code having at least one associated signature is made available to the security controller. The security controller is used to decrypt the encrypted program code and to verify it using the at least one signature. It is detected whether the decrypted program code is intended for the application controller and/or for the security controller. The detection is taken as a basis for at least partly replacing the program in the memory and/or the further program in the further memory with the decrypted program code. A result of the verification is taken as a basis for clearing the at least partly replaced program and/or the at least partly replaced further program for execution.

In tachographs having protection against manipulation, this also allows an executable program for the application controller and/or security controller to be updated. The advantages of a tachograph having such an architecture for the security controller and the interaction with an application controller include the large scale integration of security functions in the security controller.

The program code may comprise a portion of the respective executable program or the entire respective executable program. An executable program should be understood to mean that it can be interpreted and hence executed by a processor in the respective controller as a series of commands and implements one or more functions of the tachograph. By contrast, data does not represent an interpretable series of commands. Data can be used during execution of a prescribed command. Preferably, data is processed by the respective program.

The at least one signature can be used to verify the decrypted program code or to verify the encrypted program code.

The program code can also be provided for the security controller in unencrypted form, in which case the security controller preferably no longer performs decryption but rather performs only the verification. The unencrypted program code then corresponds to the decrypted program code. It is also possible for partly encrypted program code to be provided.

The further memory, which may also be comprised by the security controller, stores not only the further program but also cryptological keys, which the encryption unit uses to encrypt and/or sign vehicle operating data. The further program and the cryptological keys are preferably protected against manipulation and stored in the further memory with protection against unauthorized access.

The verification using the signature may comprise a check on an integrity of the encrypted or decrypted program code, i.e. a check on the state of the program code being intact and unaltered. Alternatively or in addition, the verification can also be used to check an originator status for the encrypted or decrypted program code. In this case, the program code may comprise only one signature or a plurality of signatures which, by way of example, are associated with the prescribed sections of the program code and allow verification of only these prescribed sections. This can be accomplished using symmetrical and/or asymmetrical signature methods, such as RSA, MD5 and/or SHA methods.

In one embodiment, the security controller is used to identify and/or authenticate a source for the encrypted program code. The identification and/or authentication is taken as a basis for providing the security controller with the encrypted program code. As a result, even before the encrypted program code is provided, it is possible to establish whether the source is trustworthy. The source preferably represents a separate and external appliance and may be a diagnostic appliance or computer, for example, and can communicate with the tachograph using a wired or wireless link.

In a further advantageous refinement, the decrypted program code is buffer-stored in the application controller and/or the security controller. The program in the memory and/or the further program in the further memory is/are replaced by the buffer-stored decrypted program code if the verification is successful. Preferably, the complete program code is buffer-stored. This allows secure updating of the respective program. If verification is unsuccessful, the respective program is preferably not replaced but rather the previous program continues to be executed. Hence, the full previous functionality of the tachograph is available to the user even after an unsuccessful update.

In one embodiment, the encrypted program code is decrypted packet-by-packet using the security controller. The program in the memory and/or the further program in the further memory are replaced packet-by-packet by the relevant program code decrypted on a packet-by-packet basis. The at least partly replaced program and/or the at least partly replaced further program are cleared for execution if the verification is successful. This allows a particularly low memory requirement in the respective controller and at the same time a particularly fast update for the respective program.

BRIEF DESCRIPTION OF THE DRAWINGS

Exemplary embodiments of the invention are explained in more detail below with reference to the schematic drawings, in which.

Elements having the same design or function are provided with the same reference symbols throughout the figures.

DETAILED DESCRIPTION OF THE PREFERRED EMBODIMENTS

Figure 1:
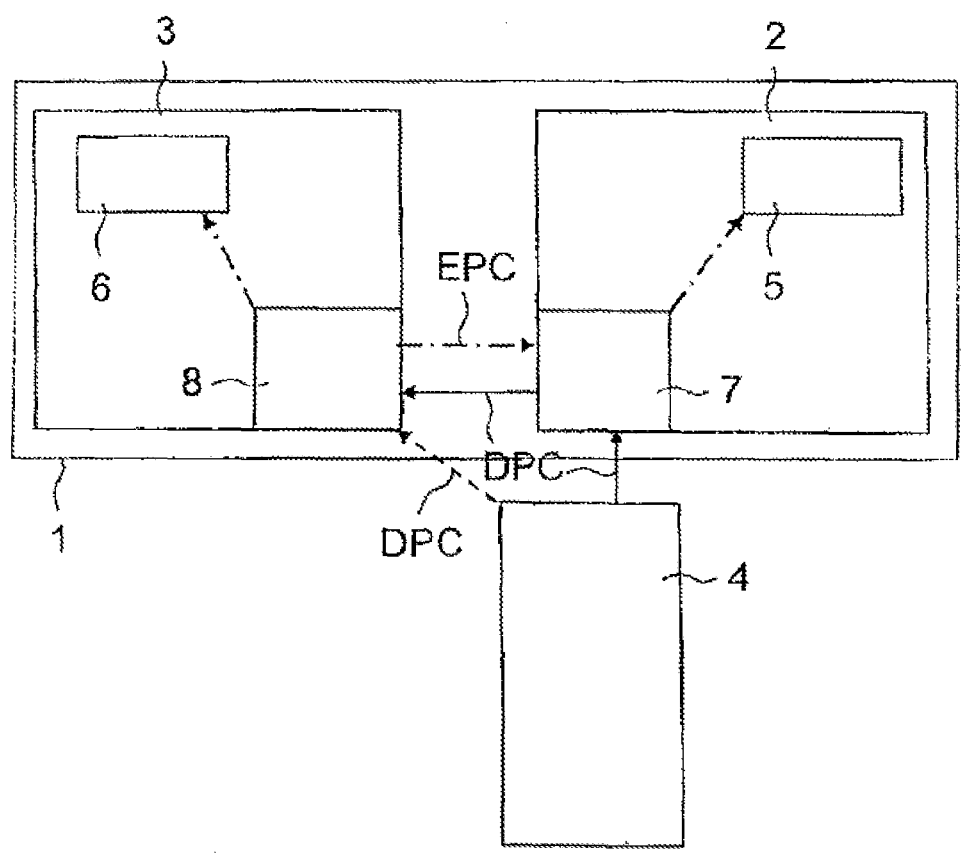
FIG. 1 is a schematic illustration of a tachograph.

FIG. 1 shows a schematic illustration of a tachograph 1 which comprises an application controller 2 and a security controller 3.

The application controller 2 has an interface 7 and a memory 5, which, by way of example, is in the form of a nonvolatile memory, such as a flash memory, battery-buffered SRAM, or FRAM. The memory 5 stores a program, particularly an application program, which can be executed by a processor in the application controller 2. The program can be used to implement the main functions of the tachograph 1. Besides the program, there may also be communication programs stored in the memory 5, said communication programs allowing communication with the security controller 3 and/or with external appliances using the interface 7. In addition, the memory 5 may also store memory management programs that allow the memory 5 to be erased, managed, and/or reprogrammed. Furthermore, there may also be data, for example vehicle and/or driver data, stored in the memory 5. Preferably, the application controller 2 is designed to at least partly replace only the program in the memory 5 with a relevant decrypted program code EPC.

The security controller 3 has a further interface 8 and a further memory 6, which, by way of example, is also in the form of a nonvolatile memory, such as a flash or EEPROM memory. The further memory 6 stores a further program that can be executed by a further processor in the security controller 3. The further program can be used to implement the security functions of the tachograph 1. To this end, not only the further program but also cryptological functions and cryptological data, for example cryptological keys, may be stored in the further memory 6. In addition, the data and programs associated with the security controller 3 may also be stored in the further memory 6 in encrypted form. By way of example, the security controller 3 is in the form of a controller that is also used in chip cards and is optimized for executing cryptological operations. The further program preferably comprises no cryptological computation operations, but rather these are provided only by the cryptological functions which are called by the further program. Furthermore, memory management programs for the further memory 6 and communication programs may be stored in the further memory 6. Preferably, the security controller 3 is designed to at least partly replace only the further program in the further memory 6 with a relevant decrypted program code EPC.

The interface 7 is electrically coupled to the further interface 8, as a result of which communication between the application controller 2 and the security controller 3 is possible. By way of example, the communication between the two controllers 2, 3 may be in serial and/or parallel form and can take place as master/slave communication. In this case, the application controller 2 represents the "master" controller and the security controller 3 represents the "slave" controller. Furthermore, the application controller 2 may also be designed to be coupled to an external appliance 4, and to communicate therewith, by the interface 7. In addition, the application controller 2 may also have a further interface for communication with the external appliance 4.

The communication with the external appliance 4 can take place in wired and serial and/or parallel fashion. Even wireless communication between the application controller 2 and the external appliance 4 or between the security controller 3 and the external appliance 4 would be possible.

The external appliance 4, which is in the form of a diagnostic appliance or in the form of a portable computer can be used to provide the application controller 2 with an encrypted and with a signature-comprising program code DPC on the interface 7. The encrypted program code DPC comprises a program code intended to replace the current program in the memory 5 or the current further program in the further memory 6 as part of a software update. Since the application controller 2 is not designed to perform cryptological computation operations, the encrypted program code DPC provided cannot be interpreted directly by the processor of the application controller 2. Therefore, the application controller 2 is designed to recognize the encrypted program code DPC from header data which are associated with the encrypted program code DPC and are unencrypted and to forward it to the security controller 3, in particular without alteration.

The security controller 3 is designed to receive and decrypt the encrypted program code DPC and to check the program code for integrity and/or authenticity using the associated signature. To this end, the security controller 3 can decrypt the encrypted program code DPC on a packet-by-packet basis, for example on a byte-by-byte or data word-by-data word basis. In addition, the security controller 3 is designed to detect whether the decrypted program code EPC is intended for the application controller 2 and/or for the security controller 3. Accordingly, the detection can be taken as a basis for transferring the decrypted program code EPC to the application controller 2 on a packet by packet basis or for replacing the further program in the further memory 6 on a packet by packet basis with the program code decrypted on a packet by packet basis EPC.

By way of example, the interfaces 7, 8 are in the form of SPI or SCI, CAN, RS-232, PC, or ISO 9018.3 interfaces.

The decrypted program code EPC can replace the program in the memory 5 and/or the further program in the further memory 6 on a packet by packet basis, i.e. a packet of the decrypted program code EPC is stored, in particular reprogrammed, at the address associated with this packet in the respective memory. This may require at least partial erasure of a memory area associated with the program in the respective memory beforehand.

The packet-by-packet replacement of the program and/or the further program with the relevant decrypted program code EPC has the advantage that a memory requirement is very low and an update can take place particularly quickly. If the verification of the signature is unsuccessful, however, this is also communicated to the application controller 2. The security controller 3 and the application controller 2 are each designed to execute, or clear for execution, the replaced program code only if the verification is successful, and are otherwise designed to block execution. This prevents the execution of program code for which the necessary authenticity and/or integrity has not been successfully verified and hence is untrustworthy. So long as no trustworthy program is provided in this case, the security controller 3 and/or the application controller 2 remain(s) in a blockade mode in which only communication programs, decryption programs and/or memory management programs can be executed, but not the program and/or the further program in the respective memory.

Alternatively or in addition, the decrypted program code EPC can first of all be buffer-stored completely in the security controller 3 or in the application controller 2 in a respective RAM store. In this case, the program in the memory 5 and/or the further program in the further memory 6 can be replaced by the decrypted program code EPC only if the verification is successful. This has the advantage that the previous program and/or the previous further program is/are stored in the respective memory until they are replaced by an appropriate trustworthy program code. If verification is unsuccessful, the buffer-stored program code can be erased and ignored. The previous program and the previous further program therefore remain unaltered and can continue to be executed. Therefore the tachograph 1 remains fully functional even if an attempt is made to transfer an untrustworthy program code to the application controller 2 and/or to the security controller 3. In a further embodiment, the external appliance 4 may also be electrically coupled to the further interface 8 of the security controller 3 directly in order to allow communication and in order to provide the security controller 3 with the encrypted program code DPC furnished with the signature directly. The security controller 3 may also have a further additional interface for this purpose.

Figure 2:
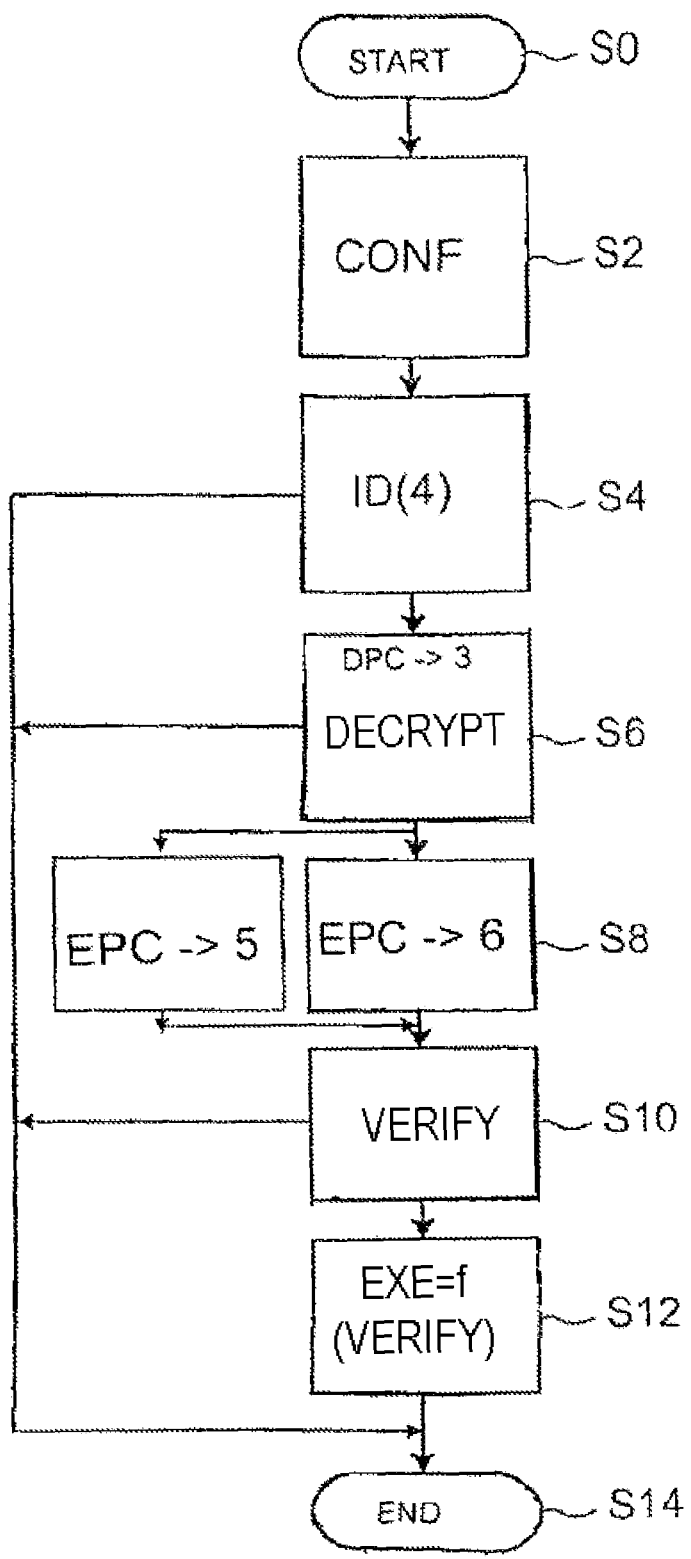
FIG. 2 is a flowchart.

FIG. 2 is a flow chart of a method for operating the tachograph 1. The method is started in a step S0. In a step S2, configuration CONF is performed, which configures the interface 7, 8 so that the external device 4 can provide the encrypted program code DPC. In addition, the connection between the external appliance 4 and the respective interface can be made. If the security controller 3 is designed for this purpose, it is alternatively also possible to configure communication between the security controller 3 and the external appliance 4.

In a step S4, the security controller 3 is used to identify and/or authenticate the external appliance 4 itself directly or via the interface 7 of the application controller 2. The external appliance 4 can therefore also be referred to as a source for the encrypted program code DPC. If the identification ID and/or authentication of the external appliance 4 is unsuccessful, the update is terminated in a step S14. If, on the other hand, the external appliance 4 is identified and/or authenticated successfully, the encrypted program code DPC is made available to the security controller 3 and said security controller is used to decrypt encrypted program code DPC and to determine the controller 2, 3 with which the decrypted program code EPC needs to be associated, in a step S6. The encrypted program code DPC may also have associated encrypted or decrypted header data which are evaluated by the application controller 2 and/or the security controller 3 before the encrypted program code DPC is decrypted DECRYPT. During this header data check, it is possible to compare version numbers of the program code with version numbers of the previous programs, for example. If the header data check is unsuccessful, the update is terminated in step S14. Otherwise, the detection of the target of the program code is taken as a basis for supplying the decrypted program code EPC to the further memory 6 in a step S8 and/or for making it available to the memory 5 of the application controller 2 via the interface 7 in a step S9. In this case, the decrypted program code EPC can replace the respective program in the respective memory on a packet by packet basis. The encrypted or decrypted program code DPC, EPC can also be buffer-stored completely in the respective controller.

In a step S10, the signature is then verified using the security controller 3. If the verification VERIFY is unsuccessful, the update is terminated in step S14. The buffer-stored program code can be erased in step S10, and the blockade mode can be prescribed for the security controller 3 and/or the application controller 2. Alternatively, the update can be performed afresh in step S2 or S4 in the event of unsuccessful verification VERIFY.

If the verification VERIFY is successful execution EXE of the respective replaced program is cleared, or the respective program is replaced by the buffer-stored program code and then cleared for execution EXE, in a step S12. In step S14 the update is terminated. The verification of the signature can also be executed as early as in step S6, in which case step S10 can be ignored.

The external appliance 4 can also provide the application controller 2 or the security controller 3 with an unencrypted or partly encrypted program code.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a tachograph having an application controller and a security controller, wherein the application controller has an associated memory that stores a program executed by the application controller, and the security controller has an associated further memory that stores a further program executed by the security controller, wherein the application controller is connected to the security controller, the method comprising:
   providing an encrypted program code having at least one associated signature to the security controller;
   evaluating header data of the encrypted program code, wherein the header data is one of encrypted and decrypted;
   decrypting by the security controller the encrypted program code if the header data check is successful;
   verifying the decrypted program code using the at least one signature;
   detecting whether the decrypted program code is intended for at least one of the application controller and the security controller;
   replacing at least one of the program in the memory and the further program in the further memory with the decrypted program code based at least in part on the detection; and
   clearing at least one of the at least partly replaced program and the at least partly replaced further program for execution based at least in part on a result of the verification.

2. The method as claimed in claim 1, further comprising:
   at least one of identifying and authenticating a source for the encrypted program code by the security controller; and
   providing the security controller with the encrypted program code based at least in part on the at least one of identifying and authenticating.

3. The method as claimed in claim 2, further comprising:
buffer-storing the decrypted program code is in at least one of the application controller and the security controller; and
replacing at least one of the program in the memory and the further program in the further memory by the buffer-stored decrypted program code based on a successful verification.

4. The method as claimed in claim 2, further comprising:
decrypting the encrypted program code on a packet-by-packet basis using the security controller;
replacing, at least partly, at least one of the program in the memory and the further program in the further memory on a packet-by-packet basis by the program code decrypted on a packet-by-packet basis; and
clearing the at least one of the at least partly replaced program and the at least partly replaced further program for execution if the verification is successful.

5. A tachograph comprising:
an application controller connected to a security controller having an associated memory that stores a program that can be executed by the application controller; and
the security controller having an associated further memory that stores a further program that can be executed by the security controller, the security controller configured to:
evaluate header data of an encrypted program code, wherein the header data is one of encrypted and decrypted;
decrypt the encrypted program code that has been made available to the security controller if the evaluation of the header data is successful, the encrypted program code comprises at least one signature associated with the program code, and to verify it using the at least one signature;
detect whether the decrypted program code is intended for at least one of the security controller and the application controller;
at least partly replacing the further program in the further memory with the decrypted program code based at least in part on the detection; and
clearing the at least partly replaced further program for at least one of execution and providing the application controller with the decrypted program code based at least in part on a result of verification; and
the application controller is configured to:
take the decrypted program code as a basis for at least partly replacing the program in the memory with the decrypted program code; and
take the available result of the verification as a basis for clearing the at least partly replaced program in the memory for execution.

6. The tachograph as claimed in claim 5, wherein the security controller is configured to at least one of identify and authenticate a source for the encrypted program code and to take the at least one of the identification and authentication as a basis for decrypting and verifying the encrypted program code.

7. The tachograph as claimed in claim 6, wherein the security controller is further configured to buffer-store the decrypted program code and to take the detection as a basis for at least one of at least partly replacing the further program in the further memory with the buffer-stored decrypted program code if the verification is successful and providing the application controller with the buffer-stored decrypted program code if the verification is successful.

8. The tachograph as claimed in one of claim 7, wherein the application controller is configured to buffer-store the provided decrypted program code and to at least partly replace the program in the memory with the buffer-stored decrypted program code if there is a positive result from the verification.

9. The tachograph as claimed in claim 5, wherein the security controller is configured to decrypt the encrypted program code on a packet-by-packet basis and to at least one of replace the further program in the further memory on a packet-by-packet basis, to clear the at least partly replaced further program for execution if the verification is successful, and to provide the application controller with the program code decrypted on a packet-by-packet basis on a packet-by-packet basis.

10. The tachograph as claimed in claim 9, wherein the application controller is configured to replace the program in the memory with the decrypted program code provided on a packet-by-packet basis and to clear the at least partly replaced program for execution if there is a positive result from the verification.

* * * * *